US012556855B2

(12) United States Patent
Orton et al.

(10) Patent No.: US 12,556,855 B2
(45) Date of Patent: Feb. 17, 2026

(54) HEADSET

(71) Applicant: FalCom A/S, Ballerup (DK)

(72) Inventors: Mark Orton, Lomma (SE); Søren Pedersen, Valby (DK)

(73) Assignee: FalCom A/S, Ballerup (DK)

( * ) Notice: Subject to any disclaimer, the term of this patent is extended or adjusted under 35 U.S.C. 154(b) by 243 days.

(21) Appl. No.: 18/510,945

(22) Filed: Nov. 16, 2023

(65) Prior Publication Data

US 2024/0187781 A1 Jun. 6, 2024

(30) Foreign Application Priority Data

Dec. 1, 2022 (EP) .................................... 22210826

(51) Int. Cl.
*H04R 1/10* (2006.01)

(52) U.S. Cl.
CPC ......... *H04R 1/1075* (2013.01); *H04R 1/1008* (2013.01); *H04R 1/1033* (2013.01); *H04R 1/1041* (2013.01); *H04R 2201/107* (2013.01); *H04R 2420/07* (2013.01)

(58) Field of Classification Search
CPC .. H04R 1/1075; H04R 1/1008; H04R 1/1033; H04R 1/1041; H04R 2201/107; H04R 2420/07; H04R 2420/09; H04R 5/0335; H04R 1/105; H04R 3/12
See application file for complete search history.

(56) References Cited

U.S. PATENT DOCUMENTS

| | | | | |
|---|---|---|---|---|
| 5,197,332 A * | 3/1993 | Shennib | ............... | H04R 25/554 73/585 |
| 5,604,813 A * | 2/1997 | Evans | .............. | G10K 11/17854 381/71.13 |
| 7,818,037 B2 * | 10/2010 | Lair | .................... | H04M 1/6066 381/74 |
| 11,128,275 B2 * | 9/2021 | Kulavik | ............... | H04R 1/1041 |

(Continued)

FOREIGN PATENT DOCUMENTS

WO WO 2022015589 1/2022

OTHER PUBLICATIONS

Extended European Search Report for EP Patent Appln. No. 22210826.8 dated Jun. 1, 2023.

(Continued)

*Primary Examiner* — Oyesola C Ojo
(74) *Attorney, Agent, or Firm* — Vista IP Law Group, LLP

(57) ABSTRACT

A headset includes: a first ear cup comprising one or more first output transducers for provision of first sound based on a first audio input signal; and a second ear cup comprising one or more second output transducers for provision of second sound based on a second audio input signal; wherein the first ear cup comprises a first communication interface configured to communicatively connect to a first external device; wherein the second ear cup comprises a second communication interface having a second device connector configured to communicatively connect to a second external device; wherein the first ear cup and the second ear cup are interconnected by one or more interconnection cables; wherein the headset comprises one or more electronic circuits configured to enable the first external device to exchange non-audio data with the second external device via the one or more interconnection cables.

18 Claims, 4 Drawing Sheets

(56) References Cited

U.S. PATENT DOCUMENTS

| | | | | |
|---|---|---|---|---|
| 11,395,078 | B2 * | 7/2022 | Lin | G01H 11/06 |
| 12,317,063 | B2 * | 5/2025 | Hassager | G01S 7/412 |
| 2011/0158440 | A1 * | 6/2011 | Mei | H04R 1/1075<br>381/309 |
| 2014/0079257 | A1 * | 3/2014 | Ruwe | F21V 21/084<br>381/74 |
| 2014/0270200 | A1 * | 9/2014 | Usher | G10L 25/78<br>381/74 |
| 2016/0216943 | A1 * | 7/2016 | Welti | H04R 5/033 |
| 2016/0286019 | A1 * | 9/2016 | Broadley | H04M 1/6058 |
| 2016/0302029 | A1 * | 10/2016 | Broadley | H04M 1/6058 |
| 2017/0311887 | A1 * | 11/2017 | Leussler | A61B 5/02416 |
| 2019/0057681 | A1 * | 2/2019 | Rachakonda | H04R 1/1083 |
| 2020/0236456 | A1 * | 7/2020 | Gallo | H04R 1/1008 |
| 2021/0399707 | A1 * | 12/2021 | Kulavik | H04R 1/1041 |
| 2021/0400412 | A1 * | 12/2021 | Degraye | H04R 5/033 |
| 2022/0021959 | A1 * | 1/2022 | Andrikowich | H01R 13/629 |
| 2024/0007781 | A1 * | 1/2024 | Attwood | H04R 1/1066 |
| 2024/0123254 | A1 * | 4/2024 | Nikolovska | A61N 5/0622 |

OTHER PUBLICATIONS

"Tactical Communications and Hearing Protection," PELTOR, pp. 1-16, dayed Dec. 31, 2016.

"3M™ Peltor™ ComTac™ VI NIB and SWAT-TAC™ VI NIB," PELTOR, pp. 1-24, dated Dec. 31, 2019.

* cited by examiner

HEADSET

RELATED APPLICATION DATA

This application claims priority to, and the benefit of, European Patent Application No. 22210826.8 filed on Dec. 1, 2022. The entire disclosure of the above application is expressly incorporated by reference herein.

FIELD

The present disclosure relates to headsets. More specifically, the disclosure relates to a headset configured to be worn by a user. The headset comprises a first ear cup configured to be worn at a first ear of the user. The headset comprises a second ear cup configured to be worn at the respective other, second ear of the user. The first ear cup comprises one or more first output transducers for provision of sound to the first ear in dependence on a first audio input signal. The second ear cup comprises one or more second output transducers for provision of sound to the second ear in dependence on a second audio input signal.

BACKGROUND

Headsets may be used for multiple purposes. Headsets may be hearing protection headsets configured to protect the hearing and the ears of the user, e.g. in that the headset comprises a noise cancellation functionality. Headsets may be communications headsets configured for enabling the user to communicate with other persons via the headset. Headsets may be configured to be used for military, police or other tactical purposes, and such headsets may comprise a number of cables connected to external devices, such as a communications radio, a camera etc. in order to provide corresponding sound signals to the user.

However, with the generally increased interconnectivity of devices, a headset user in a combat or rescue scenario is challenged by the increased number of cables required to connect the headset and such external devices to each other. There is thus a need for a solution that allows for a reduction of the number of cables required to enable the exchange of data between body-worn devices such as a headset.

SUMMARY

The inventors have realized that a generic headset can be modified to provide a solution to the above problem by serving as a connection channel or hub for the exchange of data between other devices worn by the user, such as e.g. helmet-worn devices and devices worn in pockets of a vest or other suit. Such devices typically exchange various types of non-audio data with each other. In the present context, the term “non-audio data” refers to data that comprise data that do not represent audio signals, such as e.g. vision data, image data, video data, tactical data, position data, user input data, actuator data and/or sensor data. Such non-audio data may optionally further comprise data that do represent audio signals, such as user voice audio data and/or speech audio data received from a radio. In other terms, a non-audio data signal, i.e. a stream of non-audio data, comprises other data than audio data and may optionally further comprise audio data. For instance, non-audio data may be e.g. video data that comprise both an image signal and an audio signal.

Disclosed is a headset configured to be worn by a user. The headset comprises a first ear cup configured to be worn at a first ear of the user. The headset comprises a second ear cup configured to be worn at the respective other, second ear of the user. The first ear cup comprises one or more first output transducers for provision of sound to the first ear in dependence on a first audio input signal. The second ear cup comprises one or more second output transducers for provision of sound to the second ear in dependence on a second audio input signal. The first ear cup comprises a first communication interface configured for connecting to a first external device. The first communication interface comprises a wireless transceiver and/or a first device connector configured to detachably connect to a first device cable. The second ear cup comprises a second communication interface comprising a second device connector. The second device connector is configured to detachably connect to a second device cable for connecting to a second external device. The first ear cup and the second ear cup are interconnected by one or more interconnection cables. The headset comprises one or more electronic circuits configured to enable the first external device, being connected to the first communication interface of the first ear cup, to exchange non-audio data with the second external device, being connected to the second device connector of the second communication interface of the second ear cup, via the one or more interconnection cables.

The headset is configured to be worn by a user. The headset may be configured to be worn on the head of the user. The headset may be configured to be worn on the ears of the user. The headset may be a hearing protection headset configured to protect the hearing and the ears of the user, e.g. in that the headset comprises a passive and/or active noise cancellation functionality. The headset may be a communications headset configured for enabling the user to communicate orally with other persons via the headset, such as talking and/or listening to other persons, and/or for exchanging non-audio data with other persons and/or systems. The headset may be configured to be used for military, police, or other tactical purposes. The headset may be configured to be used by soldiers, police officers or other people in combat or rescue situations.

The headset comprises a first ear cup configured to be worn at a first ear of the user. The first ear cup may comprise a wired and/or wireless interface for establishing connections to e.g. an external radio device worn by the user. The first ear cup may further comprise a first audio input transducer that provides a first audio output signal for transmission to an external device, such as the radio device. The first audio input transducer may be a boom arm microphone enabling the user to speak to other people via the external radio device.

The headset comprises a second ear cup configured to be worn at the respective other, second ear of the user. The second ear cup may comprise an interface for establishing connections to other external devices such as a camera, a head-up display, a head tracker etc. These other external devices may be mounted on a helmet.

Instead of, or in addition to, the first audio input transducer of the first ear cup, the second ear cup may further comprise a second audio input transducer that provides a second audio output signal for transmission to an external device, such as the radio device. The second audio input transducer may be a boom arm microphone enabling the user to speak to other people via the external radio device.

The first and the second ear cups may be over-the-ear or around-the-ear ear cups, which fully encapsulate the outer ears for protection of the ears, for reducing noise, and for generally improving control of the sound heard by the user.

The first ear cup comprises one or more first output transducers for provision of sound to the first ear in dependence on a first audio input signal. The second ear cup comprises one or more second output transducers for provision of sound to the second ear in dependence on a second audio input signal. The first output transducer(s) and the second output transducer(s) may be speakers, loudspeakers, or other electroacoustic transducers. The sound provided by the output transducers may be an acoustic sound signal. The output transducers may be for provision of sound to the ears when receiving an audio input signal or in response to receiving an audio input signal.

The first audio input signal may be a signal received from a connected communication radio/phone/device. Other sound signals may also be provided to the user's ears via the output transducers, e.g. ambient sound/sound from the surroundings e.g. via a hear-through mode in the ear cups.

The first audio input signal and the second audio input signal may be derived from one and the same signal, i.e. a mono signal, received from the radio/phone/device. Alternatively, the first audio input signal and the second audio input signal may be left/right signals provided to the left/right ear cups as stereo signals/surround sound signal etc.

The first ear cup comprises a first communication interface configured for connecting to a first external device. The first communication interface comprises a wireless transceiver and/or a first device connector configured to detachably connect to a first device cable. The first communications interface may be configured for exchange and/or communication of signals, such as audio signals, non-audio data, etc. The first communications interface may comprise means for wireless communication and/or exchange of such signals, such as a wireless transceiver. The first communications interface may comprise means for wired communication and/or exchange of such signals, such as a first device connector, e.g. a radio/data connector. The first external device, which the first communications interface is configured for connection to, may be a radio, a communications radio etc.

Thus, the first ear cup comprises a first communication interface which may comprise a first device connector, such as a radio/data connector and which may be connected to a first external device, such as a radio device through the first device connector and a first device cable, such as a radio/data cable, that is detachable from the first device connector. Instead of, or in addition to, the first device connector, the first communication interface may comprise a wireless transceiver for communicating with external devices, such as the first external device, e.g. radio device.

The second ear cup comprises a second communication interface comprising a second device connector. The second communications interface may be configured for communication and/or exchange of signals, such as audio signals, non-audio data, etc, via the device connector(s).

The second device connector is configured to detachably connect to a second device cable for connecting to a second external device. Thus, a device cable may be attached to and detached from a device connector. The attachment and/or detachment may be easy and quick to perform. The attachment and/or detachment may be configured to be performed by the user, using e.g. only one hand.

Thus, the second ear cup comprises a second communication interface with a second device connector and may be connected to for example an opto-electric device through the second device connector and a second device cable that is detachable from the second device connector.

The first ear cup and the second ear cup are interconnected by one or more interconnection cables. The interconnection cable(s) may be attached/mounted to the first ear cup and to the second ear cup at another location than the first communications interface and the second communications interface, respectively. The interconnection cable(s) may be permanently attached/mounted to the first ear cup and the second ear cup. Alternatively, any one or both ends of any or all of the one or more interconnection cables may be detachably connected to the respective ear cup through a respective interconnection connector.

The headset comprises one or more electronic circuits configured to enable the first external device, being connected to the first communication interface of the first ear cup, to exchange non-audio data, and optionally audio signals, with the second external device, being connected to the second device connector of the second communication interface of the second ear cup, via the one or more interconnection cables. Thus, the headset comprises one or more electronic circuits enabling the first external device to exchange non-audio data, and optionally audio signals, via the one or more interconnection cables to and/or from the second external device. The exchange of non-audio data and/or audio signals may comprise transmission and/or reception of non-audio data and/or audio signals. The non-audio data may further include audio signal data representing audio signals. Thus, both audio signals and non-audio data may be transmitted via the one or more interconnection cable(s) between the first ear cup and the second ear cup.

Thus, the first and second ear cups are interconnected through one or more interconnection cables that may be detachable from respective interconnection connectors one or both ear cups. The headset is configured to receive a first and a second audio input signal through the first communication interface and is configured to provide corresponding sound signals to the user's ears through respectively the first ear cup and the second ear cup.

Thus, the headset comprises one or more electronic circuits enabling the first external device, such as a radio device, being connected to the first communication interface to exchange non-audio data, and optionally audio signals, via the one or more interconnection cables to and/or from the second external device, such as an opto-electric device, being connected to the second device connectors of the second communication interface of the second ear cup. The headset may thus serve as a connection channel or hub for the exchange of non-audio data and optionally audio signals between the first external device and the second external device.

The first external device may be configured for wireless communication within a first frequency band suitable for long range communication. The first frequency band may e.g. be below or above 800 MHZ. The first frequency band may e.g. be above 20 MHz or above 100 MHz. The wireless transceiver 50 may be configured for short range wireless communication within a second frequency band different from, and preferably not overlapping, the first frequency band. The second frequency band may e.g. be above 800 MHZ, preferably between 900 MHz and 6 GHz. The second frequency band may be 902 MHz to 928 MHz. The second frequency band may be 2.4 to 2.5 GHZ. The second frequency band may be 5.725 GHz to 5.875 GHz. The second frequency band may be below 100 MHZ, e.g. when the wireless transceiver 50 is configured for near-field magnetic induction (NFMI) communication. The second frequency band may be between 9 MHz and 15 MHz.

In other words, the first communication interface is configured to receive the first audio input signal from the first external device, such as the radio device, and configured to provide it to a first signal processor that is configured to provide a first processed audio input signal to the first output transducer for providing sound to a first ear of the user. The first communication interface may also be configured to receive the second audio input signal from the first external device and be configured to provide it to the one or more interconnection cables for transmission to the second ear cup. The first signal processor may further be configured to receive a first audio output signal from the first audio input transducer and be configured to provide a first processed audio output signal to the first communication interface for transmission to the first external device, such as the radio device. The first communication interface may further be configured to receive a second processed audio output signal from the one or more interconnection cables and be configured to transmit it to the first external device.

The first communication interface may be configured to receive a first non-audio data input signal from the first external device, such as the radio device, and be configured to provide it to the one or more interconnection cables for transmission to the second ear cup, and/or the first communication interface may be configured to receive a first non-audio data output signal from the one or more interconnection cables and be configured to provide it to the first external device, such as the radio device.

The first communication interface may further be configured to receive a programming command, e.g. via a programming cable, from another external device, such as a third external device, such as a personal computer, and be configured to provide it to the signal processor, e.g. for updating software and/or firmware of one or more electronic circuits of the first ear cup, and/or be configured to receive a programming response from the signal processor and be configured to provide it to another external device, such as a third external device, such as a personal computer.

The second signal processor is configured to receive the second audio input signal from the one or more interconnection cables, and may be configured to process it to provide a second processed audio input signal to the second output transducer for providing sound to a second ear of the user. The second signal processor may further be configured to receive a second audio output signal from the second audio input transducer and be configured to process it to provide a second processed audio output signal to the one or more interconnection cables for transmission to the first earphone. The second communication interface may further be configured to receive a first processed audio output signal from the one or more interconnection cables and be configured to transmit it to the second external device through the second communication interface.

The second communication interface may be configured to receive a second non-audio data input signal from the second external device, and be configured to provide it to the one or more interconnection cables for transmission to the first ear cup, and/or the second communication interface may be configured to receive a second non-audio data output signal from the one or more interconnection cables and be configured to provide it to the second external device through the second communication interface.

The second communication interface may further be configured to receive a programming command, e.g. via a programming cable, from another external device, such as a third external device, such as a personal computer, and be configured to provide it to the signal processor, e.g. for updating software and/or firmware of one or more electronic circuits of the second ear cup, and/or be configured to receive a programming response from the signal processor and be configured to provide it to another external device, such as a third external device, such as a personal computer.

It is an advantage that at least one of the ear cups, being the second ear cup, of the headset has a second device connector which can detachably connect to a second device cable for connecting the headset to a second external device. It is an advantage that a second device cable can be attached and detached from the communication interface of the second ear cup, since hereby it is easy for the user to attach and detach a second device cable whenever the user needs or does not need the connection to the second external device. In prior art headsets of this type, the device cables are not detachable, but stationary.

It is an advantage that fewer cables may be required for the headset. The headset may be more user-friendly and more easy to wear, put on and take off, when there are fewer cables. Furthermore, the risk of damaging a cable or a cable connection or the headset may be reduced when less cables are attached to the headset.

It is an advantage that a wireless connection may be provided from the headset to a first external device, such as a radio/data device, such as a radio communications device, since this will provide that fewer cables are connected to the headset.

It is an advantage that both non-audio data and audio signal can be exchanged between the headset and external devices. For example, the non-audio data may comprise vision data, image data, video data, tactical data, position data, user input data, actuator data and/or sensor data in digital form, and the audio signals may be analog and/or digital. The digital non-audio data may be transmitted in parallel with the analog and/or digital audio signals. The audio signals may come from the first external device, which may e.g. be a communication radio, and the audio signals may be the voice of another user, such as a soldier colleague, which is then provided to the output transducer(s) in one or both ear cups. The non-audio data may come from e.g. the first external device, a second external device connected to the second ear cup, or may come from a third external device connected to the first ear cup and/or from a fourth external device connected to the second ear cup, and the non-audio data may comprise any combination of e.g. vision data, image data, video data, tactical data, position data, user input data, actuator data, sensor data, etc.

It is an advantage that the first ear cup and the second ear cup are interconnected by one or more interconnection cables, since hereby non-audio data and/or audio signals can be transmitted and/or received between the two ear cups. This is an advantage because the first and the second ear cup may be connected to different external devices, and by means of the interconnection cables, the non-audio data and/or audio signals from a first external device connected to the first cup can be transmitted to the second ear cup, and vice versa non-audio data and/or audio signals from a second external device connected to the second ear can be transmitted to the first ear cup, and this provides for exchanging non-audio data between the first external device and the second external device while at the same time, the user can e.g. hear audio better since the audio signal is provided to the output transducers of both ear cups.

The user of the headset may furthermore wear one or more battery packs that are configured to provide power to the radio device, the other external devices, etc. The battery pack(s) may further provide power to the headset through the first device connector, or through a third device connector comprised by the first communication interface. Alternatively, or additionally, one or more further battery packs, e.g. mounted on a helmet worn by the user, may be configured to provide power to the headset through the second or a fourth device connector of the second communication interface.

In some embodiments, the wireless transceiver comprises a short-range wireless transceiver configured for wirelessly connecting to the first external device. The wireless connection is provided via a short-range telecommunications technology. The wired connection is provided by the first communication interface comprising a first connector, such as a radio/data connector, being configured to detachably connect to a first device cable, such as a radio/data cable, for connection to the first external device. The short-range telecommunications technology may be Bluetooth (BT), such as Bluetooth Low Energy (BLE), or similar.

In some embodiments, the one or more electronic circuits are configured to receive each of the first audio input signal and the second audio input signal through the first communication interface and transmit the second audio input signal from the first ear cup to the second ear cup via the one or more interconnection cables.

In some embodiments, the first ear cup comprises a first input transducer configured to pick up the voice of the user for provision of a first audio output signal and/or the second ear cup comprises a second input transducer configured to pick up the voice of the user for provision of a second audio output signal, and wherein the one or more electronic circuits are configured to transmit the first audio output signal and/or the second audio output signal through the first communication interface. The first audio output signal and/or the second audio output signal may be transmitted to an external device, such as to the first external device which may be a communications radio for communication with other people.

The first and/or second input transducers may comprise microphones and/or vibration sensors, e.g. arranged inside the ear cup(s), such as close to ear canal, for capturing the user's own voice inside the ear. Alternatively, and/or additionally, the first and/or second input transducers may be microphones arranged on the outside of the ear cup(s) for capturing the user's own voice outside of the ear. Alternatively, and/or additionally, the first and/or second input transducers may be microphones in a boom arm on an ear cup, or both ear cups, for capturing the user's own voice outside of the ear.

In some embodiments, the one or more electronic circuits are configured to transmit the second audio output signal from the second ear cup to the first ear cup via the one or more interconnection cables.

In some embodiments, the first external device and the second external device are body-worn equipment.

In some embodiments, the first external device is a communication radio, and the second external device is an electro-optical device. The electro-optical device may be a camera, such as a night-vision camera.

In some embodiments, the one or more interconnection cables interconnecting the first ear cup and the second ear cup are arranged in a headband of the headset, and/or in a neckband of the headset, and/or as one or more separate cables of the headset.

In some embodiments, the headset is configured to be attached to a helmet by a headband, by a neckband and/or by a helmet mount. The helmet is configured to be worn by the user on the user's head.

In some embodiments, the one or more electronic circuits are configured to exchange between the first external device and the second external device non-audio data comprising vision data, image data, video data, tactical data, position data, user input data, actuator data and/or sensor data. Actuator data may e.g. be vibration data. The non-audio data may optionally further comprise audio data, i.e. data representing audio signals.

In some embodiments, the one or more electronic circuits are configured to receive from the first external device and/or the second external device, exchange between the first external device and the second external device, and/or transmit to the first external device and/or the second external device non-audio data, and optionally audio data, according to a USB protocol. Thus, the non-audio data and/or audio data may comprise USB data and/or USB signals. Universal Serial Bus (USB) is an industry standard that establishes specifications for cables, connectors and protocols for connection, communication and power supply (interfacing) between computers, peripherals and other computers. Different USB hardware exists, including around 14 different connector types, of which USB-C is the most recent and the only one not currently deprecated. The four generations of USB are: USB 1.x, USB 2.0, USB 3.x, and USB4. Thus, the non-audio data and/or audio data may comprise standard USB data and/or USB signals. The device connectors may comprise standard USB connectors and/or special USB connectors, such as military grade USB connectors.

In some embodiments, each of the first ear cup and the second ear cup comprises a bottom surface defined as the surface facing the ground when the headset is worn in its intended position on the head of the user and the user is in an upright position, wherein the first device connector of the first communication interface is arranged at the bottom surface of the first ear cup, and/or wherein the second device connector of the second communication interface is arranged at the bottom surface of the second ear cup.

It is an advantage that the connector(s) is/are arranged at the bottom surface of the ear cup, since this provides that it is easy for the user to detach a cable in the connector using only one hand. This provides more flexibility for the user, since the user can thereby use the other hand for controlling a device, moving around, keeping at balance etc.

In some embodiments, the first communication interface of the first ear cup further comprises a third device connector configured to detachably connect to a third device cable for connecting to a third external device, and the one or more electronic circuits are configured to enable the third external device, being connected to the third device connector, to exchange non-audio data with the second external device, being connected to the second device connector of the second communication interface of the second ear cup, via the one or more interconnection cables. Thus, it is an advantage that the first ear cup also comprises a third device connector for detachably connecting to a third device cable for establishing connection to a third external device. The third external device may e.g. be a head-up display attached to a helmet of the user, or a head tracker attached to a helmet of the user, or a position tracker attached to a helmet of the user, etc.

In some embodiments, the second communication interface of the second ear cup further comprises a fourth device connector configured to detachably connect to a fourth device cable for connecting to a fourth external device, and the one or more electronic circuits are configured to enable the fourth external device, being connected to the fourth device connector, to exchange non-audio data with the first external device, being connected to the first communication interface of the first ear cup, and/or with the third external device, being connected to the third device connector, via the one or more interconnection cables.

Thus, it is an advantage that the fourth device connector of the second ear cup is configured to exchange non-audio data with any connectors of the first ear cup.

In some embodiments, the one or more electronic circuits comprises one or more of a first hub, a second hub, a first switch, and a second switch.

The first communication interface may receive a programming command, e.g. via a programming cable, from another external device, such as a third external device, such as a personal computer, and provide it to the first signal processor, e.g. for updating software and/or firmware of one or more of the electronic circuits of the first ear cup, and/or receive a programming response from the first signal processor and provide it to another external device, such as a third external device, such as a personal computer.

The headset, the one or more electronic circuits and/or the first communication interface may comprise a first switch that enables selective routing of non-audio data signals, such as a first non-audio data input signal, a first non-audio data output signal, a programming command, and/or a programming response, and optionally audio signals. The first switch may be operable in a first mode, wherein it routes data signals to be exchanged between the first communication interface and the one or more interconnection cables, and in a second mode, wherein it routes data signals to be exchanged between the first communication interface and the first signal processor. The first mode may be low-power or unpowered mode, such that the first switch does not consume any electric power in the first mode, or at least less electric power than in the second mode. The first switch is preferably configured to default to operating in the first mode on power up of the headset. The first communication interface may cause the first switch to operate in the second mode upon detecting a pre-defined data structure in a programming command from an external device and/or upon receiving a signal from a user-operable control, e.g. on the headset.

The first ear cup may comprise a first hub, e.g. a USB hub, that enables a host entity, such as a USB host, to simultaneously maintain and control connections to two or more non-host entities, such as USB devices, through the first communication interface, the one or more interconnection cables and the second communication interface of the second ear cup. The host entity can be comprised in the first hub.

In a first configuration of the first hub, the first hub may provide a host interface towards the first device connector and/or the wireless transceiver and provide a device interface towards two or more of the signal processor, the one or more interconnection cables and a third device connector of the first communication interface.

In a second configuration of the first hub, the first hub may provide a host interface towards the one or more interconnection cables and provide a device interface towards two or more of the signal processor, the first device connector and/or the wireless transceiver of the first communication interface, and a third device connector of the first communication interface.

In a third configuration of the first hub, the first hub may provide a host interface towards a third device connector of the first communication interface and provide a device interface towards two or more of the signal processor, the one or more interconnection cables, the first device connector and/or the wireless transceiver. The first hub may be switchable between two or more of the first, the second and the third configurations of the first hub.

The one or more interconnection cables may be configured to provide multiple connections, such as USB connections, between the first ear phone and the second ear phone, and correspondingly, the hub may in any of the first, the second, and/or the third configuration, simultaneously provide a host interface and/or one or more device interfaces towards the one or more interconnection cables.

Any entity mentioned herein as being configured for the exchange, reception, or transmission of non-audio data, such as the one or more electronic circuits, the first communication interface, the second communication interface, the first switch, the second switch, the first hub, the second hub, and/or the interconnection connectors, may further be configured for the exchange, reception, or transmission of audio signals, such as digital and/or analog audio signals. For instance, a video signal exchanged between a video camera mounted on a user's helmet and connected to the second device connector of the headset and a third external device connected to the third device connector of the headset may comprise both an image signal and an audio signal. Thus, the term "non-audio data" shall be construed to specify the presence of data that do not represent audio signals while not excluding data that do represent audio signals.

The second communication interface may receive a programming command from another external device, such as a third external device, such as a personal computer, and provide it to the second signal processor, e.g. for updating software and/or firmware of one or more of the electronic circuits of the second ear cup, and/or receive a programming response from the second signal processor and provide it to another external device, such as a third external device, such as a personal computer.

The headset, the one or electronic circuits and/or the second communication interface may comprise a second switch that enables selective routing of non-audio data signals, such as a second non-audio data input signal, a second non-audio data output signal, a programming command, and/or a programming response, and optionally audio signals. The second switch may be operable in a first mode, wherein it routes data signals to be exchanged between the second communication interface and the one or more interconnection cables, and in a second mode, wherein it routes data signals to be exchanged between the second communication interface and the second signal processor. The first mode may be low-power or unpowered mode, such that the second switch does not consume any electric power in the first mode, or at least less electric power than in the second mode. The second switch is preferably configured to default to operating in the first mode on power up of the headset. The second communication interface may cause the second switch to operate in the second mode upon detecting a pre-defined data structure in a programming command from an external device and/or upon receiving a signal from a user-operable control, e.g. on the headset.

The second ear cup may comprise a second hub, e.g. a USB hub, that enables a host entity, such as a USB host, to simultaneously maintain and control connections to two or more non-host entities, such as USB devices, through the second communication interface, the one or more interconnection cables and the first communication interface of the first ear cup. The host entity can be comprised in the second hub.

In a first configuration of the second hub, the second hub may provide a host interface towards the second device connector of the second communication interface and provide a device interface towards two or more of the second signal processor, the one or more interconnection cables and the fourth device connector of the second communication interface.

In a second configuration of the second hub, the second hub may provide a host interface towards the one or more interconnection cables and provide a device interface towards two or more of the second signal processor, the second device connector of the second communication interface, and the fourth device connector of the second communication interface.

In a third configuration of the second hub, the second hub may provide a host interface towards the fourth device connector of the second communication interface and provide a device interface towards two or more of the second processor, the one or more interconnection cables, and/or the second device connector of the second communication interface. The second hub may be switchable between two or more of the third, the fourth and the sixth configurations of the second hub.

The one or more electronic circuits of the headset may comprise electronic circuits of the first earcup and/or electronic circuits of the second earcup. The one or more electronic circuits of the headset may comprise the first communication interface, the second communication interface, the first signal processor, the second signal processor, the first switch, the second switch, the first hub, the second hub, the interconnection connectors, any other connectors and transceiver and other electronic components, the interconnection cables and any other cables, wires, vias, and/or signal paths which are configured for transmitting and/or receiving data, such as non-audio data, data streams, sound, sound streams, audio, audio streams etc. The electronic circuits may comprise one or more of the above.

In an embodiment, a headset is configured to be worn by a user. The headset may be arranged at the user's ear, on the user's ear, and/or over the user's ear, i.e., the headset is configured to be worn on, over and/or at the user's ear. The user may wear two ear phones or ear cups, one ear phone or ear cup at each ear.

In an embodiment, the headset may comprise one or more input transducers. The one or more input transducers may comprise one or more microphones. The one or more input transducers may comprise one or more vibration sensors configured for detecting bone vibration. Each input transducer may be configured for converting an acoustic signal, i.e. sound, into the first or second audio output signal in the form of an electric output signal. The electric output signal may be an analog signal. The electric output signal may be a digital signal. Each input transducer may be coupled to an analog-to-digital converter configured for converting the analog signal into a digital signal.

The wireless transceiver may be configured for short range wireless communication using any protocol as known for a person skilled in the art, including Bluetooth, WLAN standards, manufacturer specific protocols, such as tailored proximity antenna protocols, such as proprietary protocols, such as low-power wireless communication protocols, RF communication protocols, magnetic induction protocols, etc.

In an embodiment, the headset may include a processing unit, such as the first and/or the second signal processor. The processing unit may be configured for processing the first and/or second input audio signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, active noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide the first and/or the second processed audio input signal based on the processing of respectively the first and/or second audio input signal In an embodiment, the headset may comprise one or more digital-to-analog converters configured to convert e.g. respectively the first and/or the second processed audio input signal into a respective analog signal. Correspondingly, the headset may comprise one or more analog-to-digital converters configured to convert e.g. respectively the first and/or the second audio output signal into a respective digital signal.

In an embodiment, the headset may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil.

In an embodiment, the headset may comprise a memory, including volatile and non-volatile forms of memory.

The present disclosure relates to different aspects including the headset described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
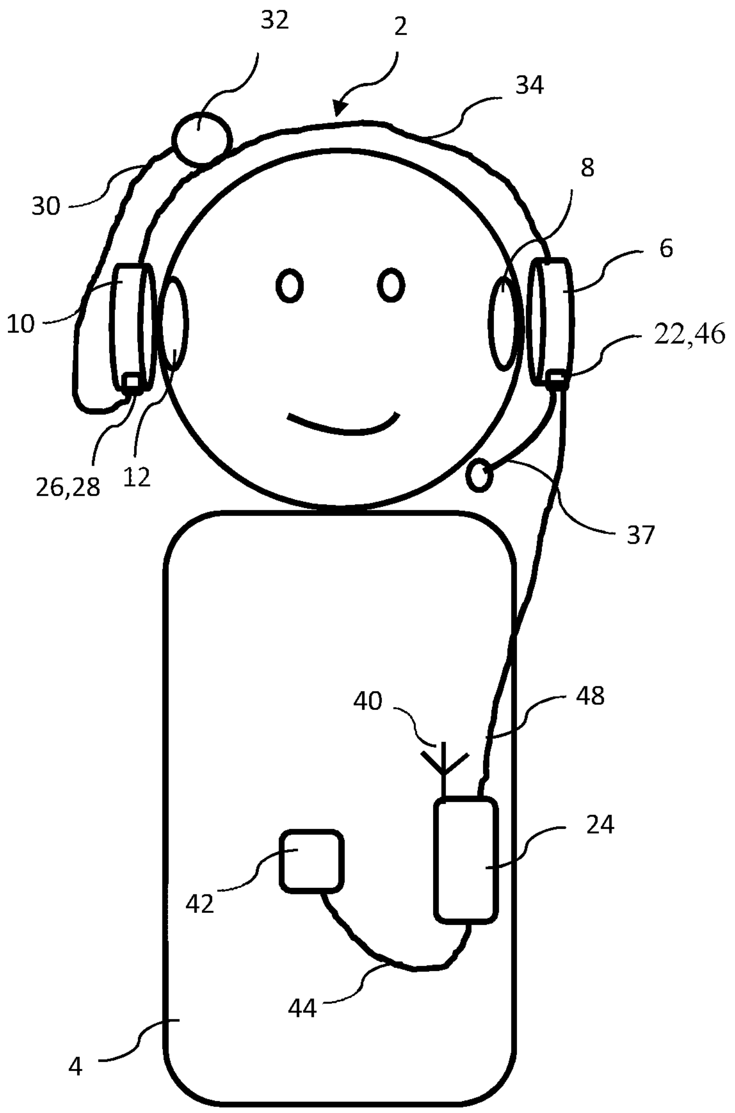
FIG. 1 schematically illustrates an exemplary a headset 2 configured to be worn by a user 4.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates an exemplary headset 2 configured to be worn by a user 4. The headset 2 comprises a first ear cup 6 configured to be worn at a first ear 8 of the user 4. The headset 2 comprises a second ear cup 10 configured to be worn at the respective other, second ear 12 of the user 4. The first ear cup 6 comprises one or more first output transducers 14 (not shown, see FIG. 2*a*) for provision of sound to the first ear 8 in dependence on a first audio input signal 16 (not shown, see FIG. 2*a*). The second ear cup 10 comprises one or more second output transducers 18 (not shown, see FIG. 2*b*) for provision of sound to the second ear 12 in dependence on a second audio input signal 20 (not shown, see FIG. 2*b*). The first ear cup 6 comprises a first communication interface 22 configured for connecting to a first external device 24. The first communication interface 22 comprises a wireless transceiver 50 (not shown, see FIG. 2*a*) and/or a first device connector 46 configured to detachably connect to a first device cable 48. The second ear cup 10 comprises a second communication interface 26 comprising a second device connector 28. The second device connector 28 is configured to detachably connect to a second device cable 30 for connecting to a second external device 32. The first ear cup 6 and the second ear cup 10 are interconnected by one or more interconnection cables 34. The headset 2 comprises an electronic circuit 36 (not shown, see FIG. 2*a*) configured to enable the first external device 24, being connected to the first communication interface 22 of the first ear cup 6, to exchange non-audio data with the second external device 32, being connected to the second device connector 28 of the second communication interface 26 of the second ear cup 10, via the one or more interconnection cables 34.

Figure 2A:
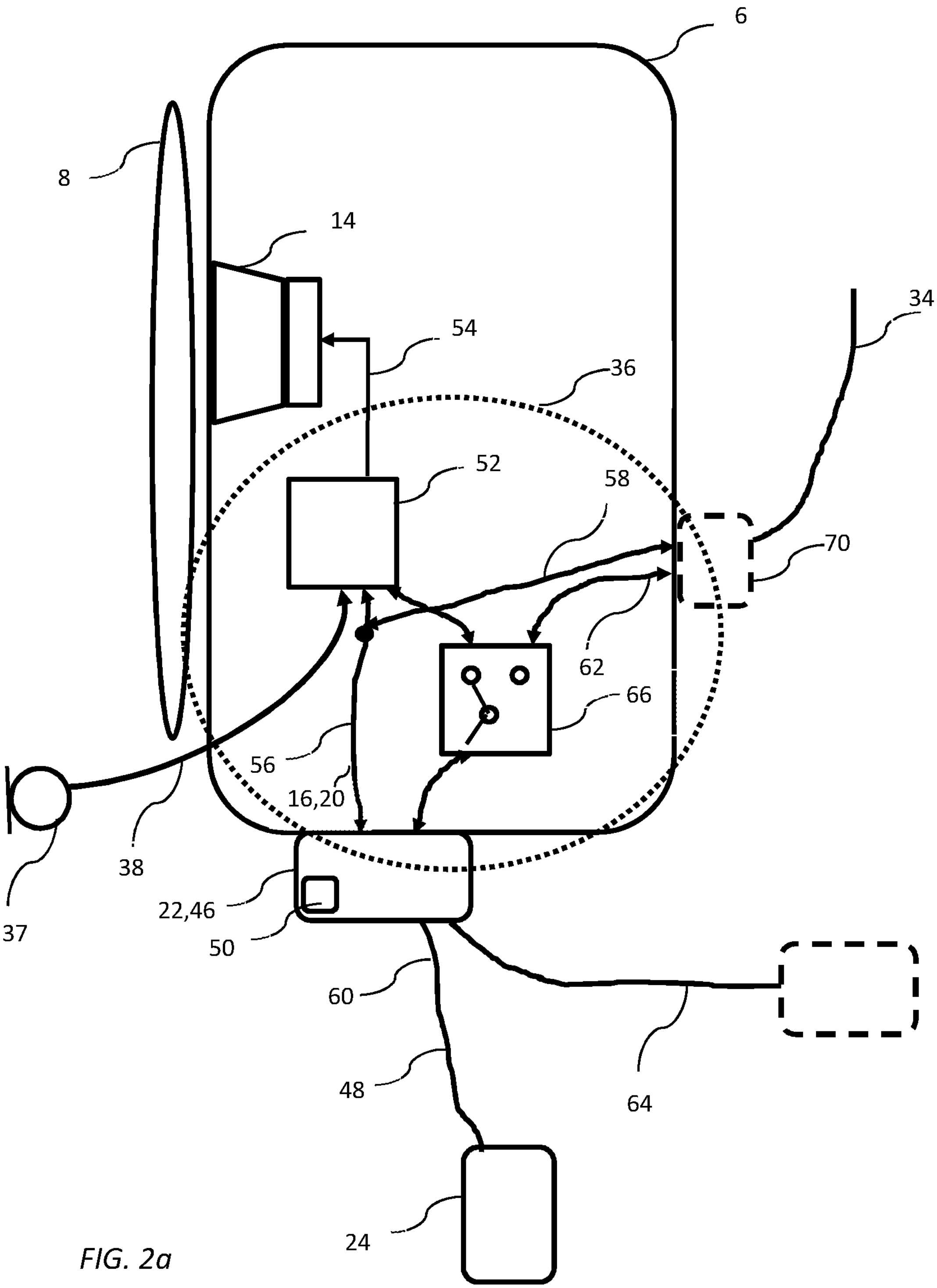
FIG. 2*a* schematically illustrates an exemplary first ear cup 6 of the headset 2.

FIG. 1 further shows that the first ear cup 6 may comprise a first input transducer 37 configured to pick up the voice sound of the user 4 for provision of a first audio output signal 38 (not shown, see FIG. 2*a*). The one or more electronic circuits 36 may be configured to transmit the first audio output signal 38 through the first communication interface 22. The first audio output signal 38 may be transmitted to an external device, such as to the first external device 24 which may be a communications radio for communication with other people.

FIG. 1 shows that the headset 2 is connected to a first external device 24, e.g. a communication radio, comprising one or more antenna(s) 40 configured for wireless communication with other radios, e.g. carried by other persons. The one or more antenna(s) 40 may comprise an electric antenna. The first external device 24 may be configured for wireless communication within a first frequency band suitable for long range communication. The first frequency band may e.g. be below or above 800 MHZ. The first frequency band may e.g. be above 20 MHz or above 100 MHz. The wireless transceiver 50 may be configured for short range wireless communication within a second frequency band different from, and preferably not overlapping, the first frequency band. The second frequency band may e.g. be above 800 MHZ, preferably between 900 MHz and 6 GHz. The second frequency band may be 902 MHz to 928 MHz. The second frequency band may be 2.4 to 2.5 GHZ. The second frequency band may be 5.725 GHz to 5.875 GHz. The second frequency band may be below 100 MHZ, e.g. when the wireless transceiver 50 is configured for near-field magnetic induction (NFMI) communication. The second frequency band may be between 9 MHz and 15 MHz.

FIG. 1 further shows that the user 4 may wear one or more battery packs 42 that provide power to the first external device 24 through a power cable 44. The battery packs 42 may further provide power to the headset 2 through the first communication interface 22, e.g. through one or more device connectors comprised by the first communication interface 22, such as through the first device connector 46.

In other words, FIG. 1 illustrates a use case for a headset 2. Herein, a user 4 wears the headset 2. The headset 2 comprises a first ear cup 6 and a second ear cup 10. The first ear cup 6 comprises a first communication interface 22 which may comprise a first device connector 46 and may be connected to a first external device 24, e.g. a radio device, through the first device connector 46 and a first device cable 48 that is detachable from the first device connector 46. Instead of, or in addition to, the first device connector 46, the first communication interface 22 may comprise a wireless transceiver 50 (not shown, see FIG. 2*a*) for communicating with external devices, such as the first external device 24, such as the radio device.

The second ear cup 10 comprises a second communication interface 26 with a second device connector 28 and is connected to a second external device 32, e.g. an opto-electronic device, through the second device connector 28 and a second device cable 30 that is detachable from the second device connector 28. The first ear cup 6 and second ear cup 10 are interconnected through one or more interconnection cables 34 that may optionally be detachable from respective interconnection connectors 70, 70' (not shown, see FIGS. 2*a* and 2*b*) at one or both ear cups 6, 10. In some embodiments of the headset 2, fewer than all of the one or more interconnection cables 34 may be connected to the first ear cup 6 and/or the second ear cup 10 through respective interconnection connectors 70, 70'. The headset 2 may be configured to receive a first audio input signal 16 (not shown, see FIG. 2*a*), and a second audio input signal 20 (not shown, see FIG. 2*b*) through the first communication interface 22 and may be configured to provide corresponding sound signals to the user's 4 ears 8, 12 through respectively the first ear cup 6 and the second ear cup 10.

The first ear cup 6 may further comprise a first audio input transducer 37 that picks up voice sound from the user 4 and provides a corresponding first audio output signal 38 (not shown, see FIG. 2*a*) for transmission to an external device, such as the first external device 24, e.g. a radio device, through the first communication interface 22. Instead of, or in addition to, the first audio input transducer 37, the second ear cup 10 may further comprise a second audio input transducer 37' (not shown, see FIG. 2*b*) that picks up voice sound from the user 4 and provides a corresponding second audio output signal 38' (not shown, see FIG. 2*b*) for transmission to an external device, such as the first external device 24, or a third external device (not shown) through the second communication interface 26.

The headset 2 comprises one or more electronic circuits 36 (not shown, see FIG. 2*a*) enabling the first external device 24, such as the radio device, being connected to the first communication interface 22 to exchange non-audio data with a second external device 32, such as the opto-electric device, being connected to the second device connector 28 of the second communication interface 26 of the second ear cup 10, via the one or more interconnection cables 34.

FIG. 2*a* schematically illustrates an exemplary first ear cup 6 of the headset 2. The first communication interface 22 is configured to receive the first audio input signal 16 from the first external device 24, such as the radio device, and configured to provide it to a first signal processor 52 that is configured to provide a first processed audio input signal 54 to the first output transducer 14 for providing sound to a first ear 8 of the user 4. The first communication interface 22 may also be configured to receive the second audio input signal 20 from the first external device 24 and may be configured to provide it to the one or more interconnection cables 34 for transmission to the second ear cup 10 (see FIG. 1 or FIG. 2*b*). The first signal processor 52 may further be configured to receive a first audio output signal 38 from the first audio input transducer 37 and may be configured to provide a first processed audio output signal 56 to the first communication interface 22 for transmission to the first external device 24, such as the radio device. The first communication interface 22 may further be configured to receive a second processed audio output signal 58 from the one or more interconnection cables 34 and may be configured to transmit it to the first external device 24.

The first communication interface 22 may be configured to receive a first non-audio data input signal 60 from the first external device 24, such as the radio device, and may be configured to provide it to the one or more interconnection cables 34 for transmission to the second ear cup 10, and/or the first communication interface 22 may be configured to receive a first non-audio data output signal 62 from the one or more interconnection cables 34 and may be configured to provide it to the first external device 24, such as the radio device.

The first communication interface 22 may further be configured to receive a programming command via a programming cable 64 from an external programming device, such as a personal computer, and be configured to provide it to the first signal processor 52, e.g. for updating software and/or firmware of one or more electronic circuits 36 of the first ear cup 6, and/or be configured to receive a programming response from the first signal processor 52 and may be configured to provide it to the external programming device, such as a personal computer.

The first communication interface 22 may comprise a first switch 66 that enables selective routing of data signals, such as the first non-audio data input signal 60, the first non-audio data output signal 62, the programming command, and/or the programming response, and optionally audio signals. The first switch 66 may be operable in a first mode, wherein it routes data signals to be exchanged between the first communication interface 22 and the one or more interconnection cables 34, and in a second mode, wherein it routes data signals to be exchanged between the first communication interface 22 and the first signal processor 52. The first mode may be low-power or unpowered mode, such that the first switch 66 does not consume any electric power in the first mode, or at least less electric power than in the second mode. The first switch 66 is preferably configured to default to operating in the first mode on power up of the headset 2. The first communication interface 22 may cause the first switch 66 to operate in the second mode upon detecting a pre-defined data structure in a programming command from an external device and/or upon receiving a signal from a user-operable control, e.g. a user-operable control comprised by the headset 2.

The arrows in FIG. 2*a* generally indicate the directions of data streams and/or audio streams.

Figure 2B:
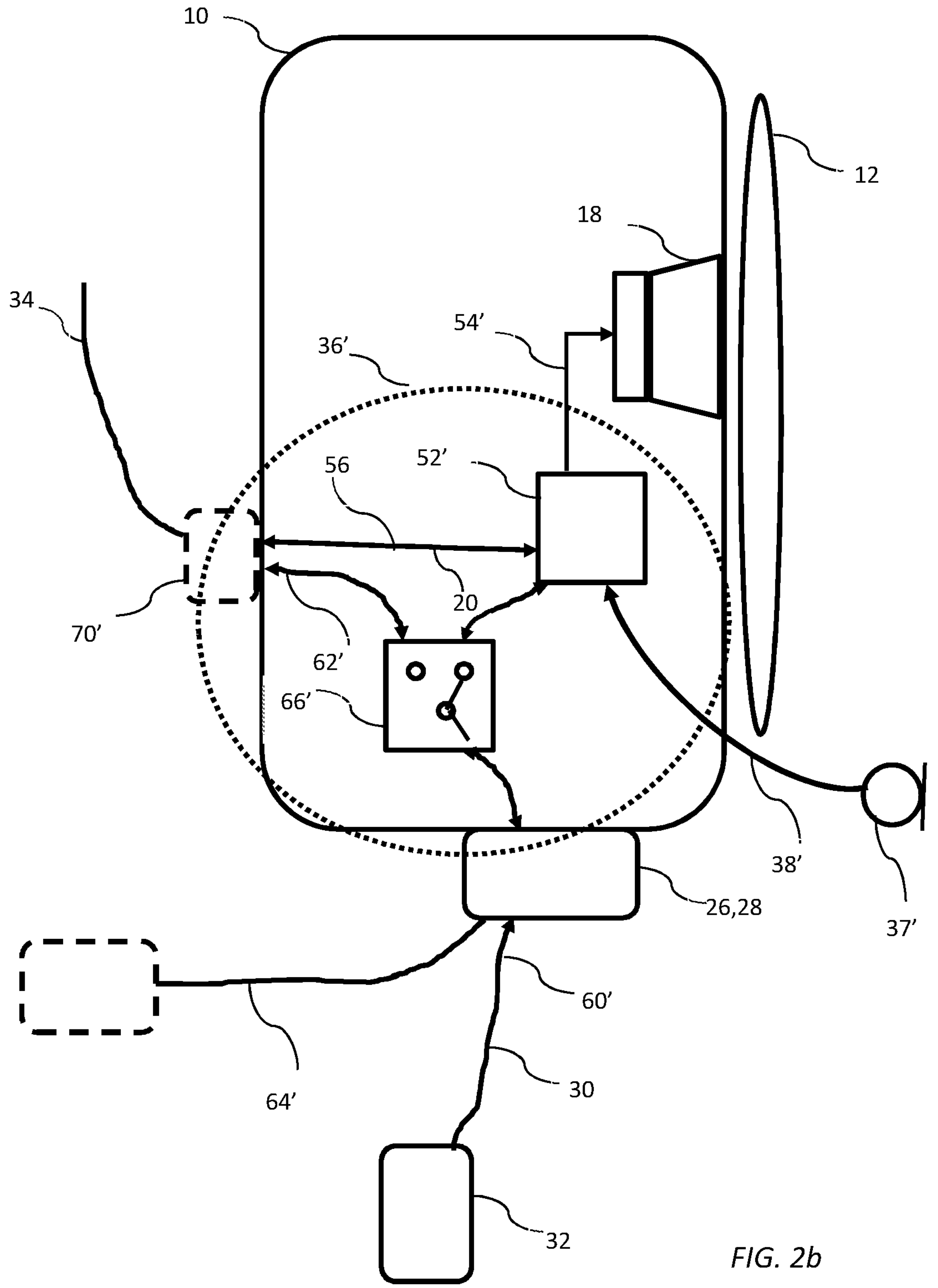
FIG. 2*b* schematically illustrates an exemplary second ear cup 10 of the headset 2.

FIG. 2*b*) schematically illustrates an exemplary second ear cup 10 of the headset 2. A second signal processor 52' is configured to receive the second audio input signal 20 from the one or more interconnection cables 34, and may be configured to process it to provide a second processed audio input signal 54' to the second output transducer 18 for providing sound to the second ear 12 of the user 4. The second signal processor 52' may further be configured to receive a second audio output signal 38' from a second audio input transducer 37' and may be configured to process it to provide a second processed audio output signal (not shown) to the one or more interconnection cables 34 for transmission to the first earphone 6. The second signal processor 52' may further be configured to receive the first processed audio output signal 56 from the one or more interconnection cables 34 and be configured to transmit it to the second external device 32 through a second communication interface 26.

The second communication interface 26 may be configured to receive a second non-audio data input signal 60' from the second external device 32, and be configured to provide it to the one or more interconnection cables 34 for transmission to the first ear cup 6, and/or the second communication interface 26 may be configured to receive a second non-audio data output signal 62' from the one or more interconnection cables 34 and be configured to provide it to the second external device 32 through the second communication interface 26.

The second communication interface 26 may further be configured to receive a programming command, via a programming cable 64', from another external device, such as a third external device, such as a personal computer, and be configured to provide it to the second signal processor 52', e.g. for updating software and/or firmware of one or more electronic circuits 36' of the second ear cup 10, and/or be configured to receive a programming response from the second signal processor 52' and be configured to provide it to another external device, such as a third external device, such as a personal computer.

The second communication interface 26 may comprise a second switch 66' that enables selective routing of data signals, such as the second non-audio data input signal 60', the second non-audio data output signal 62', the programming command, and/or the programming response. The second switch 66' may be operable in a first mode, wherein it routes data signals to be exchanged between the second communication interface 26 and the one or more interconnection cables 34, and in a second mode, wherein it routes data signals to be exchanged between the second communication interface 26 and the second signal processor 52'. The first mode may be low-power or unpowered mode, such that the second switch 66' does not consume any electric power in the first mode, or at least less electric power than in the second mode. The second switch 66' is preferably configured to default to operating in the first mode on power up of the headset 2. The second communication interface 26 may cause the second switch 66' to operate in the second mode upon detecting a pre-defined data structure in a programming command from an external device and/or upon receiving a signal from a user-operable control, e.g. on the headset 2.

The arrows in FIG. 2*b* generally indicate the directions of data streams and/or audio streams.

Figure 3:
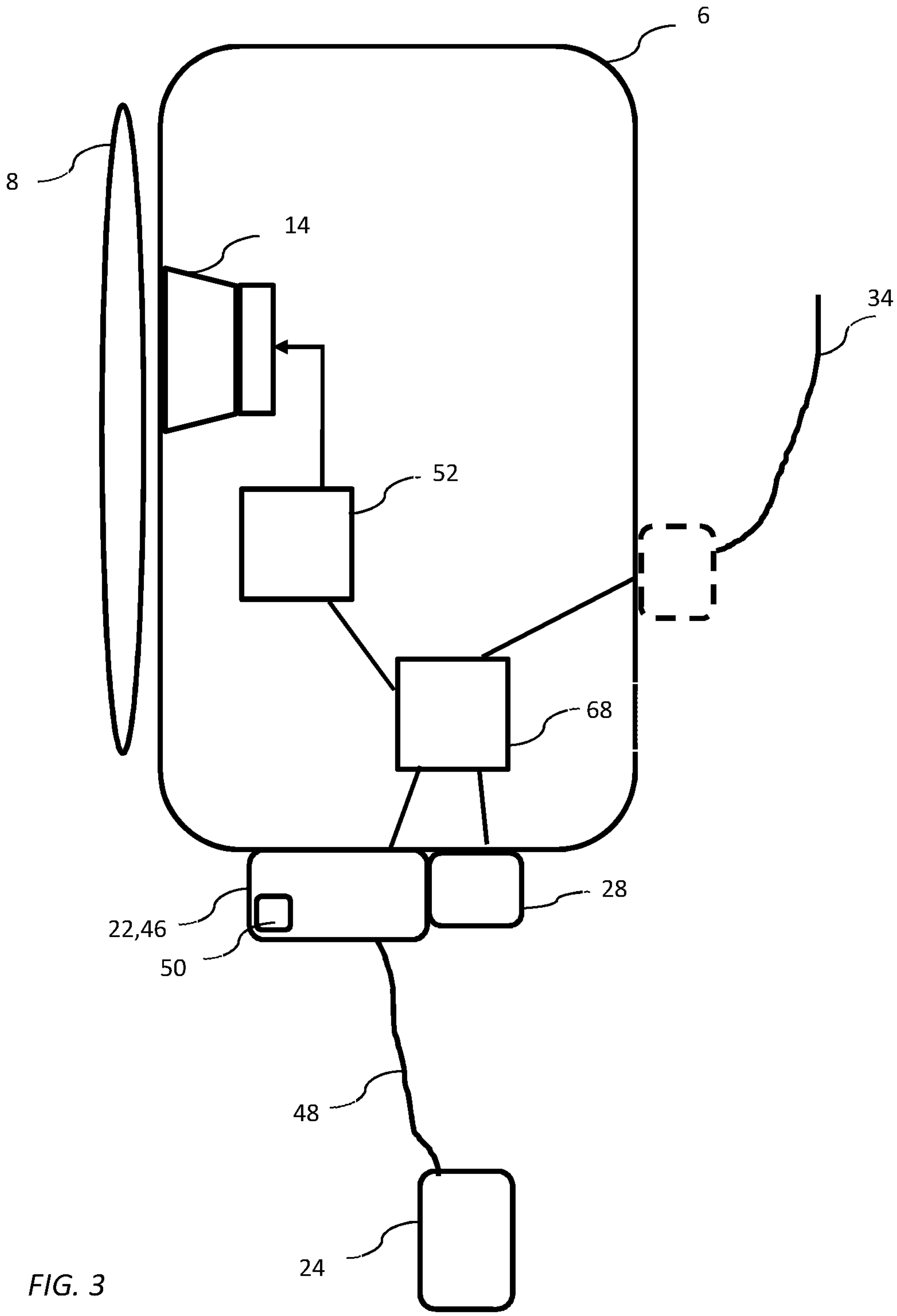
FIG. 3 schematically illustrates an exemplary first ear cup 6 of the headset 2, the first cup 6 comprising a hub 68.

FIG. 3 schematically illustrates an exemplary first ear cup 6 of the headset 2. The first ear cup 6 may comprise a hub 68, e.g. a USB hub, that enables a host entity, such as a USB host, to simultaneously maintain and control connections to two or more non-host entities, such as USB devices, through the first communication interface 22, the one or more interconnection cables 34 and the second communication interface 26 of the second ear cup 10 (see FIG. 2*b*). The host entity can be comprised in the hub 68.

In a first configuration of the hub 68, the hub 68 may provide a host interface towards the first device connector 46 and/or the wireless transceiver 50 and provide a device interface towards two or more of the first signal processor 52, the one or more interconnection cables 34 and a third device connector 28 of the first communication interface 22.

In a second configuration of the hub 68, the hub 68 may provide a host interface towards the one or more interconnection cables 34 and provide a device interface towards two or more of the first signal processor 52, the first device connector 46 and/or the wireless transceiver 50 of the first communication interface 22, and a third device connector 28 of the first communication interface 22.

In a third configuration of the hub 68, the hub 68 may provide a host interface towards a third device connector 28 of the first communication interface 22 and provide a device interface towards two or more of the first signal processor 52, the one or more interconnection cables 34, the first device connector 46 and/or the wireless transceiver 50. The hub 68 may be switchable between two or more of the first, the second and the third configurations of the hub.

The one or more interconnection cables 34 may be configured to provide multiple connections, such as USB connections, between the first ear phone 6 and the second ear phone 10, and correspondingly, the hub 68 may in any of the first, the second, and/or the third configuration, simultaneously provide a host interface and/or one or more device interfaces towards the one or more interconnection cables 34.

The one or more electronic circuits 36 of the headset 2 may comprise electronic circuits of the first earcup 6 and/or electronic circuits 36' of the second earcup 8. The one or more electronic circuits 36 of the headset 2 may comprise the first communication interface 22, the second communication interface 26, the first signal processor 52, the second signal processor 52', the first switch 66, the second switch 66', the hub 68, the interconnection connectors 70, 70', any other connectors and transceiver and other electronic components, the one or more interconnection cables 34 and any other cables, wires, vias, and/or signal paths which are configured for transmitting and/or receiving data, such as non-audio data, data streams, sound, sound streams, audio, audio streams etc. The electronic circuits 36 may comprise one or more of the above.

Any entity mentioned herein as being configured for the exchange, reception, or transmission of non-audio data, such as the one or more electronic circuits 36, the first communication interface 22, the second communication interface 26, the first switch 66, the second switch 66', the first hub 68, the second hub, and/or the interconnection connectors 70, 70', may further be configured for the exchange, reception, or transmission of audio signals, such as digital and/or analog audio signals. For instance, a video signal exchanged between a video camera mounted on a user's helmet and connected to the second device connector of the headset 2 and a third external device connected to the third device connector of the headset 2 may comprise both an image signal and an audio signal. Thus, the term "non-audio data" shall be construed to specify the presence of data that do not represent audio signals while not excluding data that do represent audio signals.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. A headset configured to be worn by a user, the headset comprising:
   a first ear cup configured to be worn at a first ear of the user;
   a second ear cup configured to be worn at the respective other, second ear of the user;
   wherein the first ear cup comprises one or more first output transducers for provision of sound to the first ear in dependence on a first audio input signal;
   wherein the second ear cup comprises one or more second output transducers for provision of sound to the second ear in dependence on a second audio input signal;
   wherein the first ear cup comprises a first communication interface configured for connecting to a first external device, the first communication interface comprising a wireless transceiver and/or a first device connector configured to detachably connect to a first device cable;
   wherein the second ear cup comprises a second communication interface comprising a second device connector, wherein the second device connector is configured to detachably connect to a second device cable for connecting to a second external device;
   wherein the first ear cup and the second ear cup are interconnected by one or more interconnection cables;
   wherein the headset comprises one or more electronic circuits configured to enable the first external device, being connected to the first communication interface of the first ear cup, to exchange non-audio data with the second external device, being connected to the second device connector of the second communication interface of the second ear cup, via the one or more interconnection cables.
2. The headset according to any of the preceding items, wherein the wireless transceiver comprises a short-range wireless transceiver configured for wirelessly connecting to the first external device.
3. The headset according to any of the preceding items, wherein the one or more electronic circuits are configured to receive each of the first audio input signal and the second audio input signal through the first communication interface and transmit the second audio input signal from the first ear cup to the second ear cup via the one or more interconnection cables.
4. The headset according to any of the preceding items, wherein the first ear cup comprises a first input transducer configured to pick up the voice of the user for provision of a first audio output signal and/or the second ear cup comprises a second input transducer configured to pick up the voice of the user for provision of a second audio output signal, and wherein the one or more electronic circuits are configured to transmit the first audio output signal and/or the second audio output signal through the first communication interface.
5. The headset according to the preceding item, wherein the one or more electronic circuits are configured to transmit the second audio output signal from the second ear cup to the first ear cup via the one or more interconnection cables.
6. The headset according to any of the preceding items, wherein the first external device and the second external device are body-worn equipment.

7. The headset according to any of the preceding items, wherein the first external device is a communication radio, and wherein the second external device is an electro-optical device.
8. The headset according to any of the preceding items, wherein the one or more interconnection cables interconnecting the first ear cup and the second ear cup are arranged in a headband of the headset, and/or in a neckband of the headset, and/or as one or more separate cables of the headset.
9. The headset according to any of the preceding items, wherein the headset is configured to be attached to a helmet by a headband, by a neckband and/or by a helmet mount.
10. The headset according to any of the preceding items, wherein the one or more electronic circuits are configured to exchange between the first external device and the second external device non-audio data comprising vision data, image data, video data, tactical data, position data, user input data, actuator data and/or sensor data, and further optionally comprising audio signals.
11. The headset according to any of the preceding items, wherein the one or more electronic circuits are configured to receive from the first external device and/or the second external device, exchange between the first external device and the second external device, and/or transmit to the first external device and/or the second external device non-audio data and/or audio signals according to a USB protocol.
12. The headset according to any of the preceding items, wherein the first ear cup and the second ear cup each comprises a bottom surface, defined as the surface facing the ground when the headset is worn in its intended position on the head of the user and the user is in an upright position, and wherein the first device connector of the first communication interface is arranged at the bottom surface of the first ear cup, and wherein the second device connector of the second communication interface is arranged at the bottom surface of the second ear cup.
13. The headset according to any of the preceding items, wherein the first communication interface of the first ear cup further comprises a third device connector configured to detachably connect to a third device cable for connecting to a third external device, and wherein the one or more electronic circuits are configured to enable the third external device, being connected to the third device connector, to exchange non-audio data with the second external device, being connected to the second device connector of the second communication interface of the second ear cup, via the one or more interconnection cables.
14. The headset according to any of the preceding items, wherein the second communication interface of the second ear cup further comprises a fourth device connector configured to detachably connect to a fourth device cable for connecting to a fourth external device, and wherein the one or more electronic circuits are configured to enable the fourth external device, being connected to the fourth device connector, to exchange non-audio data with the first external device, being connected to the first communication interface of the first ear cup, and/or with the third external device, being connected to the third device connector, via the one or more interconnection cables.
15. The headset according to any of the preceding items, wherein the one or more electronic circuits comprises one or more of a first hub, a second hub, a first switch, and a second switch.

LIST OF REFERENCES

2 headset
4 user
6 first ear cup
8 first ear
10 second ear cup
12 respective other, second ear
14 first output transducer(s)
16 first audio input signal
18 second output transducer(s)
20 second audio input signal
22 first communication interface
24 first external device
26 second communication interface
28 second/third device connector
30 second device cable
32 second external device
34 interconnection cable(s)
36, 36' electronic circuit(s)
37 first (audio) input transducer(s)
37' second (audio) input transducer(s)
38 first audio output signal
38' second audio output signal
40 antenna(s)
42 battery pack(s)
44 power cable
46 first device connector
48 first device cable
50 wireless transceiver
52 first signal processor
52' second signal processor
54 first processed audio input signal
54' second processed audio input signal
56 first processed audio output signal
58 second processed audio output signal
60 first non-audio data input signal
60' second non-audio data input signal
62 first non-audio data output signal
62' second non-audio data output signal
64, 64' programming cable
66 first switch
66' second switch
68 hub
70, 70' interconnection connector(s)

The invention claimed is:

1. A headset configured to be worn by a user, the headset comprising:
a first ear cup configured to be worn at a first ear of the user;
a second ear cup configured to be worn at a second ear of the user;
wherein the first ear cup comprises one or more first output transducers for provision of first sound to the first ear based on a first audio input signal;
wherein the second ear cup comprises one or more second output transducers for provision of second sound to the second ear based on a second audio input signal;
wherein the first ear cup comprises a first communication interface configured to communicatively connect to a first external device, the first communication interface comprising a wireless transceiver and/or a first device connector;

wherein the second ear cup comprises a second communication interface having a second device connector, the second device connector configured to communicatively connect to a second external device;

wherein the first ear cup and the second ear cup are interconnected by one or more interconnection cables;

wherein the headset comprises one or more electronic circuits configured to enable communication of non-audio data between the first external device and the second external device via the one or more interconnection cables, when the first communication interface of the first ear cup is communicatively connected to the first external device, and when the second device connector of the second communication interface of the second ear cup is communicatively connected to the second external device;

wherein the first ear cup comprises a first input transducer configured to pick up voice of the user for provision of a first audio output signal, and/or wherein the second ear cup comprises a second input transducer configured to pick up the voice of the user for provision of a second audio output signal; and wherein the one or more electronic circuits are configured to transmit the first audio output signal and/or the second audio output signal through the first communication interface.

2. The headset according to claim 1, wherein the wireless transceiver comprises a short-range wireless transceiver configured to wirelessly connect with the first external device.

3. The headset according to claim 1, wherein the one or more electronic circuits are configured to receive each of the first audio input signal and the second audio input signal through the first communication interface, and transmit the second audio input signal from the first ear cup to the second ear cup via the one or more interconnection cables.

4. The headset according to claim 1, wherein the one or more electronic circuits are configured to transmit the second audio output signal from the second ear cup to the first ear cup via the one or more interconnection cables.

5. The headset according to claim 1, wherein the first external device and the second external device are body-worn equipment.

6. The headset according to claim 1, wherein the first external device is a communication radio, and wherein the second external device is an electro-optical device.

7. The headset according to claim 1, wherein the one or more interconnection cables interconnecting the first ear cup and the second ear cup are arranged in a headband of the headset, and/or in a neckband of the headset, and/or as one or more separate cables of the headset.

8. The headset according to claim 1, wherein the headset is configured to be attached to a helmet by a headband, by a neckband, and/or by a helmet mount.

9. The headset according to claim 1, wherein the non-audio data comprising vision data, image data, video data, tactical data, position data, user input data, actuator data, sensor data, or any combination of two or more of the foregoing.

10. The headset according to claim 1, wherein the one or more electronic circuits are configured to also communicate audio signals between the first external device and the second external device.

11. The headset according to claim 1, wherein the one or more electronic circuits are configured to receive the non-audio data and/or audio signals from the first external device and/or the second external device, and/or to transmit the non-audio data and/or the audio signals to the first external device and/or the second external device.

12. The headset according to claim 1, wherein the one or more electronic circuits is configured to enable the communication of the non-audio data between the first external device and the second external device according to a USB protocol.

13. The headset according to claim 1, wherein each of the first ear cup and the second ear cup comprises a bottom surface facing a ground when the headset is worn on a head of the user and the user is in an upright position, and wherein the first device connector of the first communication interface is at the bottom surface of the first ear cup, and wherein the second device connector of the second communication interface is at the bottom surface of the second ear cup.

14. A headset configured to be worn by a user, the headset comprising:

a first ear cup configured to be worn at a first ear of the user;

a second ear cup configured to be worn at a second ear of the user;

wherein the first ear cup comprises one or more first output transducers for provision of first sound to the first ear based on a first audio input signal;

wherein the second ear cup comprises one or more second output transducers for provision of second sound to the second ear based on a second audio input signal;

wherein the first ear cup comprises a first communication interface configured to communicatively connect to a first external device, the first communication interface comprising a wireless transceiver and/or a first device connector;

wherein the second ear cup comprises a second communication interface having a second device connector, the second device connector configured to communicatively connect to a second external device;

wherein the first ear cup and the second ear cup are interconnected by one or more interconnection cables;

wherein the headset comprises one or more electronic circuits configured to enable communication of non-audio data between the first external device and the second external device via the one or more interconnection cables, when the first communication interface of the first ear cup is communicatively connected to the first external device, and when the second device connector of the second communication interface of the second ear cup is communicatively connected to the second external device;

wherein the first communication interface of the first ear cup further comprises a third device connector configured to detachably connect to a device cable for connecting to a third external device, and wherein the one or more electronic circuits are configured to enable communication of non-audio data between the third external device and the second external device via the one or more interconnection cables.

15. The headset according to claim 14, wherein the second communication interface of the second ear cup further comprises a fourth device connector configured to detachably connect to a fourth device cable for connecting to a fourth external device, and wherein the one or more electronic circuits are configured to enable communication of non-audio data between the fourth external device and the first external device via the one or more interconnection cables.

16. The headset according to claim 1, wherein the one or more electronic circuits comprises a first hub, a second hub, a first switch, a second switch, or any combination of two or more of the foregoing.

17. The headset according to claim 1, wherein the first device connector is configured to detachably connect to a first device cable.

18. The headset according to claim 17, wherein the second device connector is configured to detachably connect to a second device cable for connecting to the second external device.

* * * * *